Patented June 16, 1925.

1,542,626

UNITED STATES PATENT OFFICE.

HUGH ALAN MACKAY, OF LONDON, ENGLAND, ASSIGNOR TO ASPHALT COLD MIX LIMITED, OF LONDON, ENGLAND.

BITUMINOUS EMULSION.

No Drawing.   Application filed April 11, 1923.   Serial No. 631,471.

*To all whom it may concern:*

Be it known that I, HUGH ALAN MACKAY, a subject of the King of England, residing at London, England, have invented certain new and useful Improvements in Bituminous Emulsions, of which the following is a specification.

This invention consists of improvements in or relating to aqueous bituminous emulsions, suitable as a binding medium in road-making; or in the manufacture of coal briquettes; or for imparting a preservative coating to stone, wood, metal and the like, as on buildings, or fences; or for impregnating concrete and the like; or for preserving felt and other materials used for roofing. The object is to produce an emulsion which will pour quite readily, which is miscible with water in any proportions, the constituents of which will not readily separate from one another, which will form a smooth film over the surface of stone or other material to which it is applied, and from which the water will evaporate, leaving a permanent film, resistant to water, of the original bituminous material from which the emulsion was prepared.

Hitherto various proposals have been made for producing such emulsions, and difficulties have been encountered.

According to the present invention a process for producing an aqueous bituminous emulsion consists in melting bitumen (e. g. of the type artificially prepared from petroleum such as Mexican asphalt) and adding thereto, with agitation first a small proportion (say 2½% to 5%) of a fatty acid or of a mixture of fatty acids, and then a dilute solution of alkali (caustic soda or potash or sodium or potassium carbonate) at a temperature of about 215°–225° F., the heating and agitation being maintained until emulsification has taken place. The emulsion may then be run into air-tight vessels, but preferably it is first cooled, agitation being continued during cooling.

It is a feature of the present invention that an unsaturated fatty acid may be used, preferably oleic acid.

The following is a description by way of example of one way of preparing an emulsion according to this invention. The apparatus in which the emulsion is made is an upright cylindrical tank having a rotatable central vertical spindle with a horizontal propeller at the bottom for agitating the contents of the cylinder without aeration. The cylinder is jacketed and may be heated with oil or superheated steam. Mexican asphalt is introduced into the cylinder and melted at a temperature of 215°–225° F. and is subjected to agitation at a constant speed. There is then added to the molten asphalt a quantity of oleic acid amounting to 4% by weight on the asphalt, the temperature being maintained at 215°–225° F. After the oleic acid has been properly incorporated, there is added slowly a hot 1–2% solution of caustic soda in quantity equivalent to 0.5% of NaOH by weight reckoned on the asphalt, the amount of water being sufficient to introduce 25 to 50 parts per 100 of the asphalt. The percentage of alkali varies according to the acidity to be neutralized, but where oleic acid and caustic soda are employed, the total quantity of NaOH should be one-eighth part of the quantity of oleic acid.

By means of a regulator for the steam or other heating jacket the temperature of the mixture within the tank is maintained substantially constant at 215°–225° F. while the additions of fatty acid and alkali are being made. The caustic soda solution is added gradually until there is a marked increase in the viscosity of the mixture and the surface of the latter turns a brown colour where the alkali is poured in, whereupon the remainder of the alkali solution may be added en masse, agitation being continued. To the emulsion, which at this stage contains 19–32% of water, any further water required may now be added, agitation being continued. The emulsion is thereafter cooled preferably while agitation is still maintained, or agitation may be continued until the emulsion is run into vessels which are rendered air-tight.

In place of oleic acid, other similar unsaturated fatty acids may be used, such for example as the mixture of fatty acids obtained from linseed oil or from marine oil. It is within the invention to employ a mixture of fatty acids, one or more of which is or are unsaturated like oleic acid, while the remaining acid or acids is or are saturated. Again in place of caustic soda, caustic potash or sodium or potassium carbonate may be used in equivalent proportion. The asphalt or other solid bituminous material (e. g.

pitch) may be mixed with or replaced by coal-tar or other tar. The fatty acid may be replaced partly or entirely by a resin or resin oil.

The resulting emulsion is a liquid which pours quite readily; it does not readily separate out into its constituents, but can be transported in any convenient receptacles and used at ordinary temperatures.

The invention also provides a method of applying bitumen in the cold to the "metal" of road surfaces which consists in mixing the cold emulsion, prepared as hereindescribed, with or otherwise applying it to a mineral aggregate, viz, stone, gravel, sand or the like. The emulsion may be diluted with water (preferably soft water) and mixed with the mineral aggregate, the mixture being applied in a cold state to a concrete or other road foundation. The surface is thereafter consolidated by rolling or otherwise, but without the application of heat. The mineral particles are preferably damped before the emulsion is applied to them. Instead of mixing the emulsion with the mineral aggregate, the former may be applied, for example by spraying, to a foundation of road metal which has already been laid. The invention further includes a method of making briquettes from coal or other carbonaceous material which consists in mixing an emulsion, prepared as hereindescribed, with or otherwise applying it to the carbonaceous particles to be briquetted, and compressing the material thus treated in a press to form briquettes.

It is found that when the water ultimately evaporates the resulting film on the surface of the mineral aggregate or of the carbonaceous particles has binding properties similar to those of the bitumen from which the emulsion was prepared.

The emulsion may also be used as a paint, dip, or preservative for covering metals, stone, wood, or any object which is to be preserved and rendered waterproof. For example wooden fence posts and the like may be dipped in the emulsion, or the emulsion may be applied to walls of buildings and the like with a brush. For preserving roofing, the felt or other roofing material may be either dipped in or painted with the emulsion.

I claim:—

1. A process for producing an aqueous bituminous emulsion, which consists in melting bitumen, adding thereto with agitation first a proportion, in the region of 2½–5% by weight on the bitumen, of an emulsifying agent comprising at least one fatty acid, and then a dilute solution of alkali at a temperature of about 215°–225° F., and maintaining the heating and agitation of the mixture until emulsification has taken place.

2. A process for producing an aqueous bituminous emulsion, which consists in melting solid bituminous material of the type artificially prepared from petroleum, and adding thereto with agitation first a proportion of fatty acid in the region of 2½–5% by weight on the bitumen, and then a dilute solution of alkali at a temperature of about 215°–225° F., the heating and agitation being maintained until emulsification has taken place.

3. A process for producing an aqueous bituminous emulsion, which consists in melting Mexican asphalt, and adding thereto with agitation first a proportion of fatty acid in the region of 2½–5% by weight on the asphalt, and then a dilute solution of alkali at a temperature of about 215°–225° F., the heating and agitation being maintained until emulsification has taken place.

4. A process for producing an aqueous bituminous emulsion, which consists in melting bitumen and adding thereto with agitation first a proportion of a higher fatty acid in the region of 2½–5% by weight on the bitumen, and then a dilute solution of alkali at a temperature of about 215°–225° F., the heating and agitation being maintained until emulsification has taken place.

5. A process for producing an aqueous bituminous emulsion, which consists in melting solid bituminous material of the type artificially prepared from petroleum and adding thereto with agitation first a proportion of an unsaturated fatty acid in the region of 2½–5% by weight on the bitumen, and then a dilute solution of alkali at a temperature of about 215°–225° F., the heating and agitation being maintained until emulsification has taken place.

6. A process for producing an aqueous bituminous emulsion, which consists in melting solid bituminous material of the type artificially prepared from petroleum and adding thereto with agitation first a proportion of oleic acid in the region of 2½–5% by weight on the bitumen, and then a dilute solution of caustic soda at a temperature of about 215°–225° F., the heating and agitation being maintained until emulsification has taken place.

7. A process for producing an aqueous bituminous emulsion which consists in melting solid bitumen of the type artificially prepared from petroleum and adding thereto with agitation first, oleic acid in amount equal to 4% by weight on the bitumen, and then a 1–2% solution of caustic soda comprising 0.5% NaOH by weight reckoned on the bitumen with sufficient water to introduce 25–50 parts per 100 of the bitumen at a temperature of about 215°–225° F., the heating and agitation being maintained until emulsification has taken place.

8. A process for producing an aqueous bituminous emulsion which consists in melting bitumen and adding thereto with agitation first, a proportion of fatty acid in the region of 2½%–5% by weight on the bitumen and then a dilute solution of alkali at a temperature of about 215°–225° F., the heating and agitation being maintained until emulsification has taken place, and thereafter cooling the emulsion while continuing the agitation.

9. A process for producing an aqueous bituminous emulsion which consists in melting solid bitumen of the type artificially prepared from petroleum and adding thereto with agitation first, oleic acid in amount equal to 4% by weight on the bitumen, and then a 1–2% solution of caustic soda comprising 0.5% NaOH by weight reckoned on the bitumen with sufficient water to introduce 25–50 parts per 100 of the bitumen at a temperature of about 215°–225° F., the heating and agitation being maintained until emulsification has taken place, and thereafter cooling the emulsion while continuing the agitation.

10. A method of applying bitumen in the cold to the metal of road surfaces which consists in preparing an aqueous emulsion by melting bitumen and adding thereto with agitation first, a proportion of fatty acid in the region of 2½%–5% by weight on the bitumen and then a dilute solution of alkali at a temperature of about 215°–225° F., the heating and agitation being maintained until emulsification has taken place and applying the cold emulsion to a mineral aggregate.

11. A method of applying bitumen in the cold to the metal of road surfaces which consists in preparing an aqueous emulsion by melting bitumen and adding thereto with agitation first, a proportion of fatty acid in the region of 2½%–5% by weight on the bitumen and then a dilute solution of alkali at a temperature of about 215°–225° F., the heating and agitation being maintained until emulsification has taken place, diluting the emulsion with water and applying it, in the cold, to a mineral aggregate.

12. A method of applying bitumen in the cold to the metal of road surfaces which consists in preparing an aqueous emulsion by melting bitumen and adding thereto with agitation first, a proportion of fatty acid in the region of 2½%–5% by weight on the bitumen and then a dilute solution of alkali at a temperature of about 215°–225° F., the heating and agitation being maintained until emulsification has taken place, applying the cold emulsion to a mineral aggregate, and applying this bitumen-treated aggregate to a road foundation and consolidating it without the application of heat.

13. A method of applying bitumen in the cold to the metal of road surfaces which consists in preparing an aqueous emulsion by melting Mexican asphalt and adding thereto with agitation first a proportion of oleic acid in the region of 2½%–5% by weight on the asphalt and then a dilute solution of caustic soda, at a temperature of about 215°–225° F., the heating and agitation being maintained until emulsification has taken place and the agitation being thereafter continued until the emulsion is cooled, and applying the cold emulsion to a mineral aggregate.

14. A bituminous emulsion comprising bitumen, water, and a proportion of fatty acid in the region of 2½–5% by weight on the bitumen in the form of an alkali soap, the whole being an intimate admixture which is liquid in the cold and pours readily.

15. A bituminous emulsion, comprising bitumen of the type artificially prepared from petroleum, water, and 2½%–5% by weight reckoned on the bitumen of a higher fatty acid in the form of an alkali soap, the whole being an intimate admixture which is liquid in the cold and pours readily.

16. A bituminous emulsion comprising bitumen of the type artificially prepared from petroleum, water, and 2½%–5% by weight reckoned on the bitumen, of oleic acid in the form of a sodium soap, the whole being an intimate admixture which is liquid in the cold and pours readily.

17. A bituminous emulsion comprising Mexican asphalt, oleic acid in amount equal to 4% by weight reckoned on the asphalt, the acid being in the form of an alkali soap and water in amount equal to 25 to 50 parts per 100 of the asphalt, the whole being an intimate admixture which is liquid in the cold and pours readily.

In testimony whereof I affix my signature.

HUGH ALAN MACKAY.